United States Patent [19]
Foster et al.

[11] Patent Number: 5,901,035
[45] Date of Patent: * May 4, 1999

[54] ROTATING BATTERY HINGE FOR A NOTEBOOK COMPUTER

[75] Inventors: Mark J. Foster, Acton; Michele Bovio, Boston, both of Mass.

[73] Assignee: Digital Equipment Corporation, Maynard, Mass.

[ * ] Notice: This patent is subject to a terminal disclaimer.

[21] Appl. No.: 08/672,130

[22] Filed: Jun. 27, 1996

Related U.S. Application Data

[63] Continuation of application No. 08/350,369, Dec. 6, 1994, Pat. No. 5,594,617.

[51] Int. Cl.$^6$ ................................ H05K 7/00; H05K 7/16
[52] U.S. Cl. .......................... 361/683; 361/679; 429/100; 200/52 R
[58] Field of Search ...................................... 361/679–683; 429/100; 200/52 R; 439/500; 364/708.1

[56] References Cited

U.S. PATENT DOCUMENTS

| 3,641,288 | 2/1972 | Lamp | 200/52 R |
| 4,986,763 | 1/1991 | Boyle . | |
| 5,107,401 | 4/1992 | Youn . | |
| 5,583,744 | 12/1996 | Oguchi et al. | 361/683 |

*Primary Examiner*—Leo P. Picard
*Assistant Examiner*—Jayprakash N. Gandhi
*Attorney, Agent, or Firm*—Michael A. Rodriguez; Ronald C. Hudgens; Arthur Fisher

[57] ABSTRACT

A very thin portable computer includes a computer housing for holding electronic components and a battery housing movably mounted external to the computer housing, the battery housing adapted for holding batteries for supplying power to the electronic components. The battery housing is rotatably mounted on the computer housing such that the battery housing rotates between a closed position wherein the battery housing covers the rear side of the computer and an open position wherein the battery housing exposes connectors on the computer housing and elevates the rear side of the computer housing to an angle convenient for typing.

15 Claims, 11 Drawing Sheets

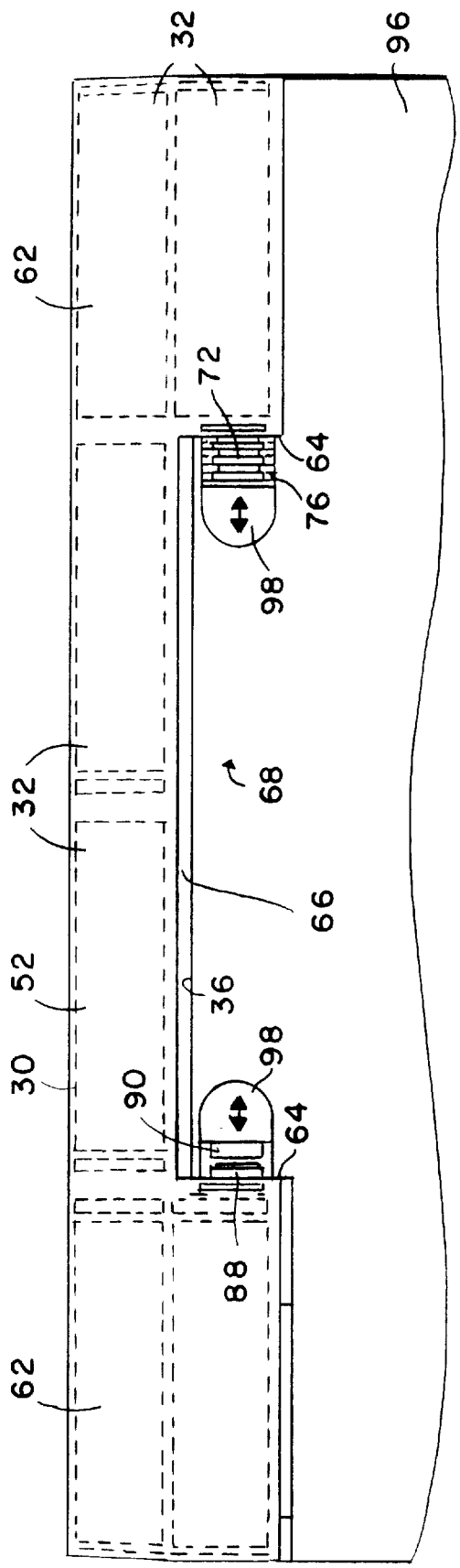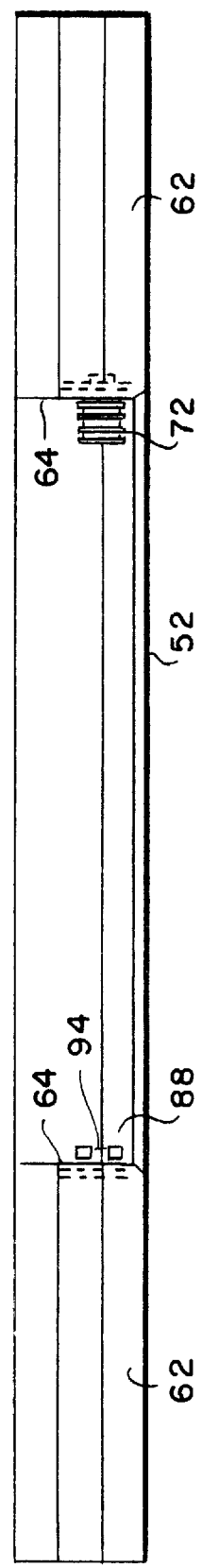

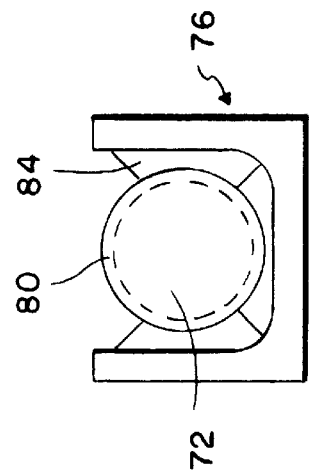
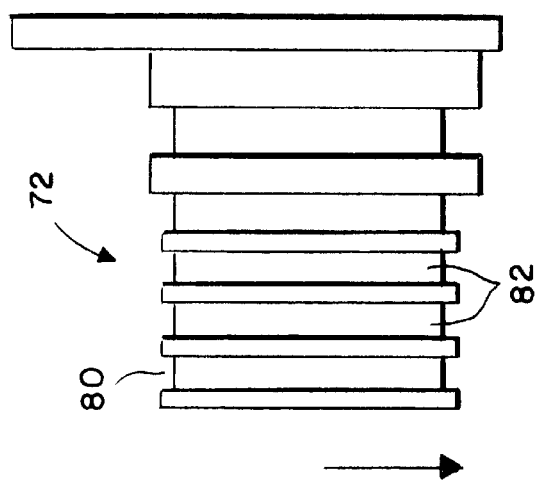
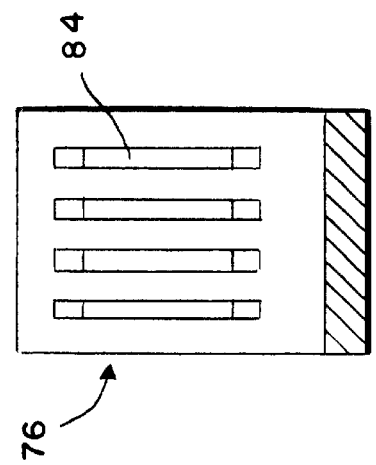
FIG. 7b
FIG. 7a

FIG.8a
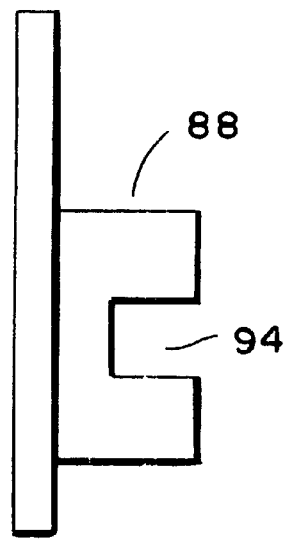
FIG.8b
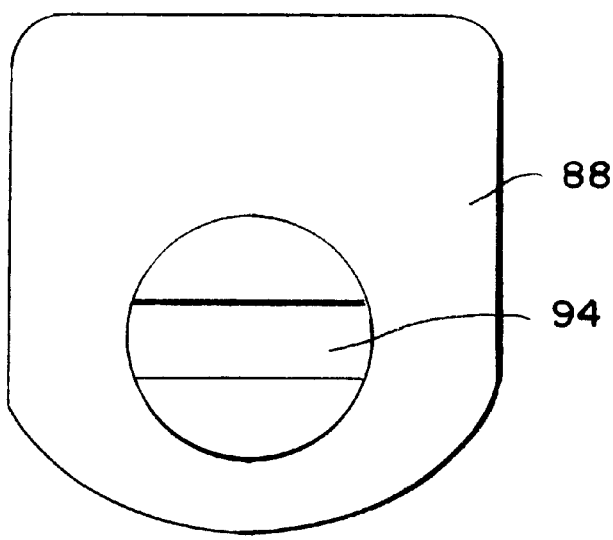
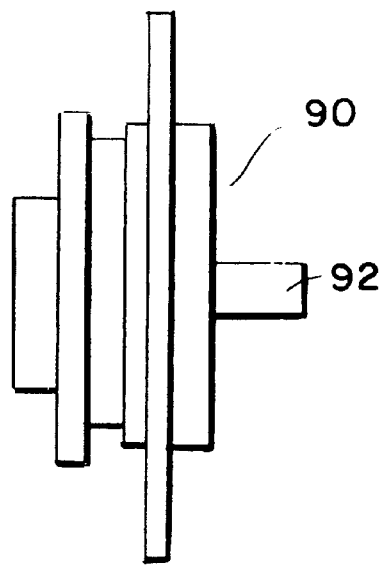
FIG.9a
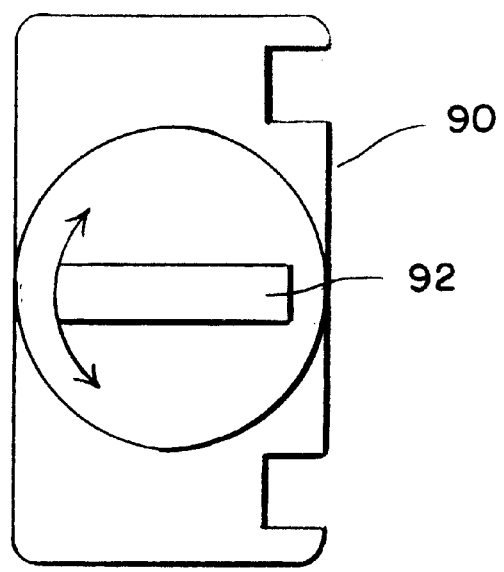
FIG.9b

ROTATING BATTERY HINGE FOR A NOTEBOOK COMPUTER

This is a continuation of application Ser. No. 08/350,369 filed on Dec. 6, 1994 now U.S. Pat. No. 5,594,617.

BACKGROUND OF THE INVENTION

The invention relates to electronic device enclosures and particularly to computer systems.

Users of personal computers have been liberated from the restrictions of desktop-only use with the introduction of portable "notebook" computers. The convenience and transportability of the notebook computer has produced a large and lucrative market for manufacturers of such machines. Portability is the key to the successful transport and use of a notebook computer in many different environments; therefore, notebook computer form factors are an exceedingly important consideration for the computer manufacturer seeking market share in this arena. The goal is to provide as thin and light-weight a machine as possible, while maintaining ease of usability of the machine.

In the past, notebook computer form factors have been limited by the sizes and placement of the necessary components within the computer. The computer designer must judiciously arrange the CPU motherboard, keyboard and keyboard baseplate, hard disk drive, options such as PERSONAL COMPUTER MEMORY CARD INTERNATIONAL ASSOCIATION (PCMCIA) slots, and the battery to provide the most compact form factor possible. To date, at least some of these components are placed beneath the keyboard baseplate, thereby sacrificing thinness in order to provide a convenient notebook computer length and width. To date, the thinnest notebook computer available is about one and one-half inches thick. It is desirable to provide an even thinner notebook computer form factor for the consumer market.

SUMMARY OF THE INVENTION

According to the principles of the invention, there is provided an assembly for holding and supplying electrical power to electronic components. The assembly includes an enclosure for holding electronic components and a housing for holding batteries. The battery housing is movably mounted externally on the enclosure for supplying electrical power to the electronic components. The battery housing can be removably mounted as well as movably mounted on the enclosure.

This principle of the invention is applied to provide a computer including a computer housing for holding electronic components within, and a battery housing movably mounted externally to the computer housing. The battery housing holds batteries for supplying power to the electronic components. The battery housing can be rotatably mounted on the computer housing, and can further be removably mounted on the computer housing.

According to an aspect of the invention, the battery housing is dimensioned such that the battery housing can move between a closed position where it covers the rear wall of the computer housing and an open position in which it elevates the rear wall of the computer housing to provide a convenient typing angle when the computer housing is resting on a support surface. Furthermore, the computer housing can have electrical connectors mounted on the rear wall. The battery housing then covers the connectors when it is rotated into the closed position, and exposes the connectors for use when it is rotated into the open position.

The battery housing is an elongated housing dimensioned to have a wide portion and a narrow portion. The narrow portion is generally coextensive with the connectors on the rear wall of the computer housing, the axis of rotation of the battery housing extending through the wide portion and generally parallel to the longitudinal axis of the battery housing, so that when the battery housing is rotated into the closed position the narrow portion covers the connectors and when the battery housing is rotated into the open position the narrow portion provides a space for exposing the connectors. The connectors are preferably positioned centrally on the rear wall of the computer housing and the narrow portion of the battery housing is preferably positioned in the center of the battery housing.

According to more specific aspects of the invention, the battery housing is an elongated housing having a narrow portion and wider end portions, the wider end portions forming opposing inwardly facing surfaces and an opening therebetween. An electrical contact is located on the battery housing at an inner facing surface and serves to electrically contact a mating electrical contact located on the computer housing. This electrical contact is preferably also a rotatable contact, providing for rotational motion of the battery housing as well as the transfer of electrical power between the batteries and the electrical components within the computer housing.

By providing an assembly including an enclosure for holding electronic components and a battery housing movably mounted externally on the enclosure for supplying electrical power to the electronic components, a way has been found to provide a notebook computer with an externally mounted movable battery housing. The remaining computer components are then arranged with the computer housing to provide a notebook computer which is only one inch thick, and therefore at least 33% thinner than presently available portable notebook computers.

BRIEF DESCRIPTION OF THE DRAWINGS

FIG. 4 is a plan view of the computer from below. The under side of the notebook computer of FIG. 1 showing the rotatable and electric mounting of the battery pack;

FIG. 5 is a elevation view of the battery pack housing, removed from its computer mounting, embodying the principles of the invention;

FIGS. 7a, 7b, and 7c are views of the electrical contact that couples one side of the battery housing to the computer housing;

FIGS. 8(a) and (b) are views of the joint for rotatably coupling the other side of the battery housing to the computer enclosure;

FIGS. 9(a) and (b) are views of the mating socket on the computer housing which accepts the joint of FIG. 8;

DETAILED DESCRIPTION OF THE PREFERRED EMBODIMENT

Figure 1:
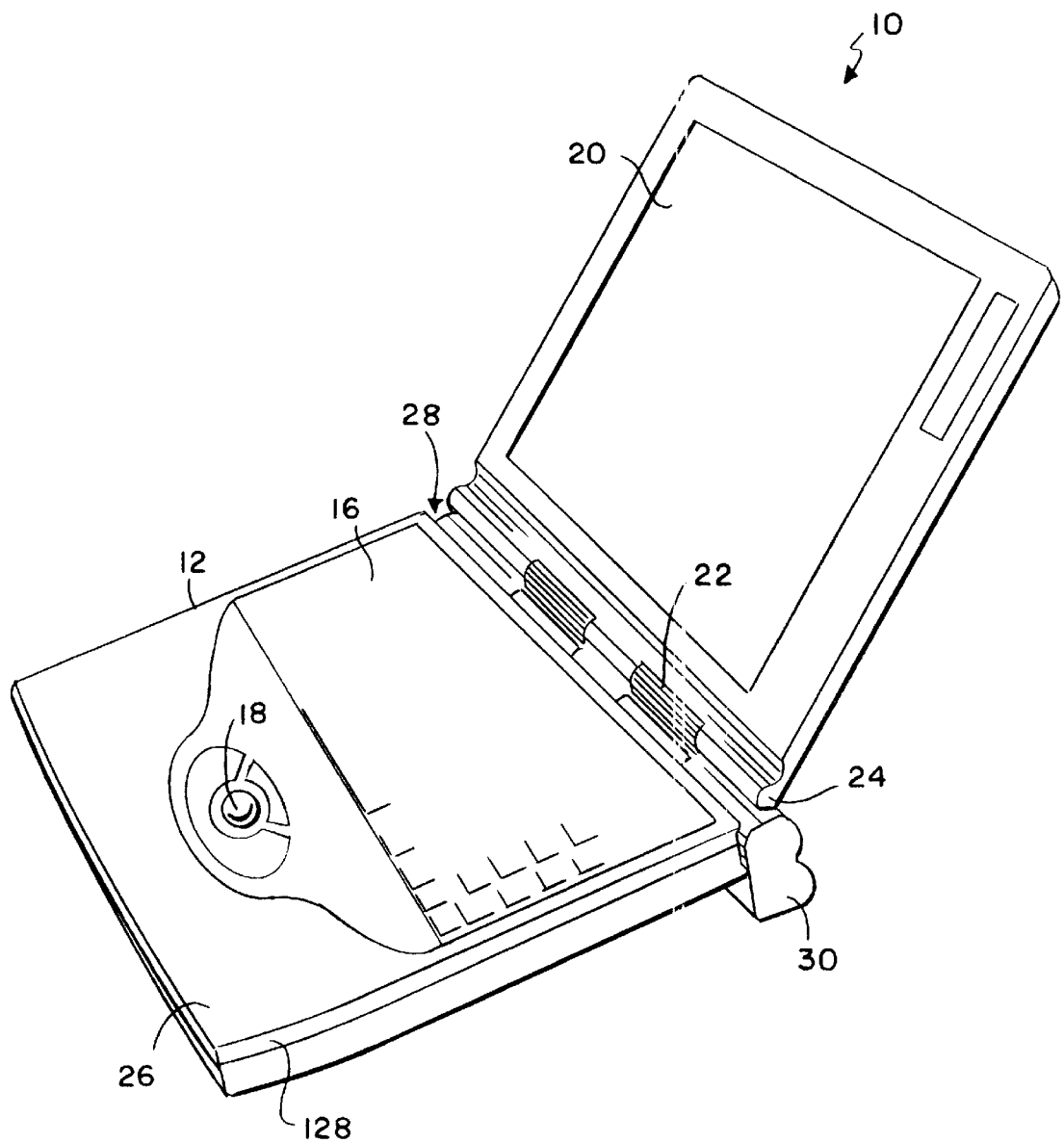
FIG. 1 is a top perspective view of a notebook computer, with its screen top open, embodying the principles of the invention.

In FIG. 1 there is shown a portable notebook computer 10 embodying the principles of the invention. The notebook computer 10 includes a computer enclosure or computer housing 12, inside which the electronic components 14 (not shown) of the computer 10 reside (e.g. a CPU motherboard on which component chips reside, a hard disk drive, PCMCIA slot, etc). On the top side of the computer housing 12 is a keyboard 16 for entering data and a trackball 18 used to move a cursor device about a display screen 20. The display screen 20 is rotatably mounted via a display screen hinge 22 at its rear edge 24 to the top side 26 of the computer housing 12 at its rear side 28.

On this rear side 28 is mounted a separate battery housing 30 which holds batteries 32 (FIG. 4) for supplying electrical power to the electronic components 14 within the computer housing 12. With the battery housing 30 mounted external to the computer housing 12, it is possible to arrange the electronic components 14 within the computer housing 12 to provide a very thin notebook computer 10.

Figure 2:
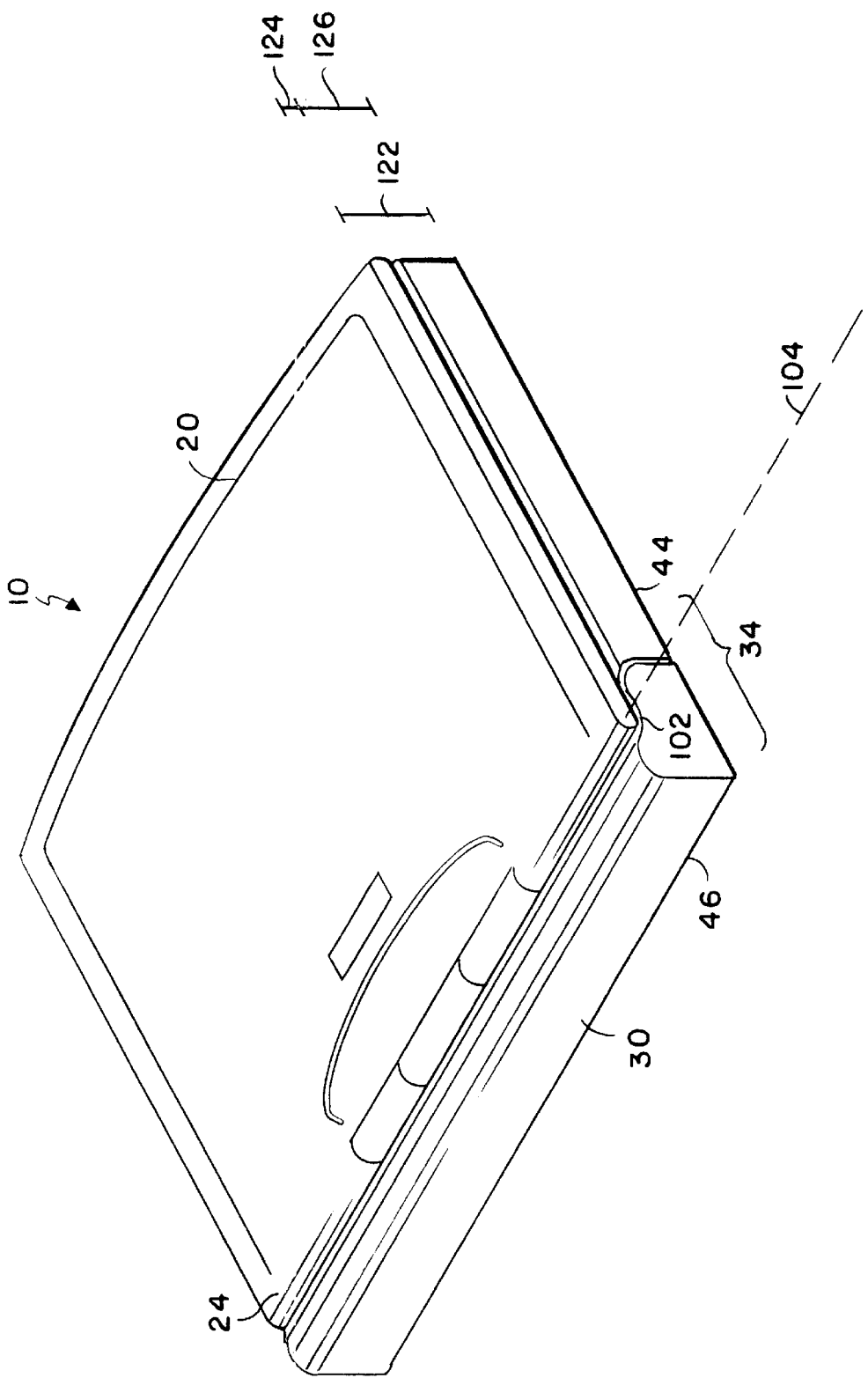
FIG. 2 is a top perspective view from the rear of the notebook computer of FIG. 1 with its top closed. The exteriorly mounted battery pack is shown in its closed position.
Figure 3:
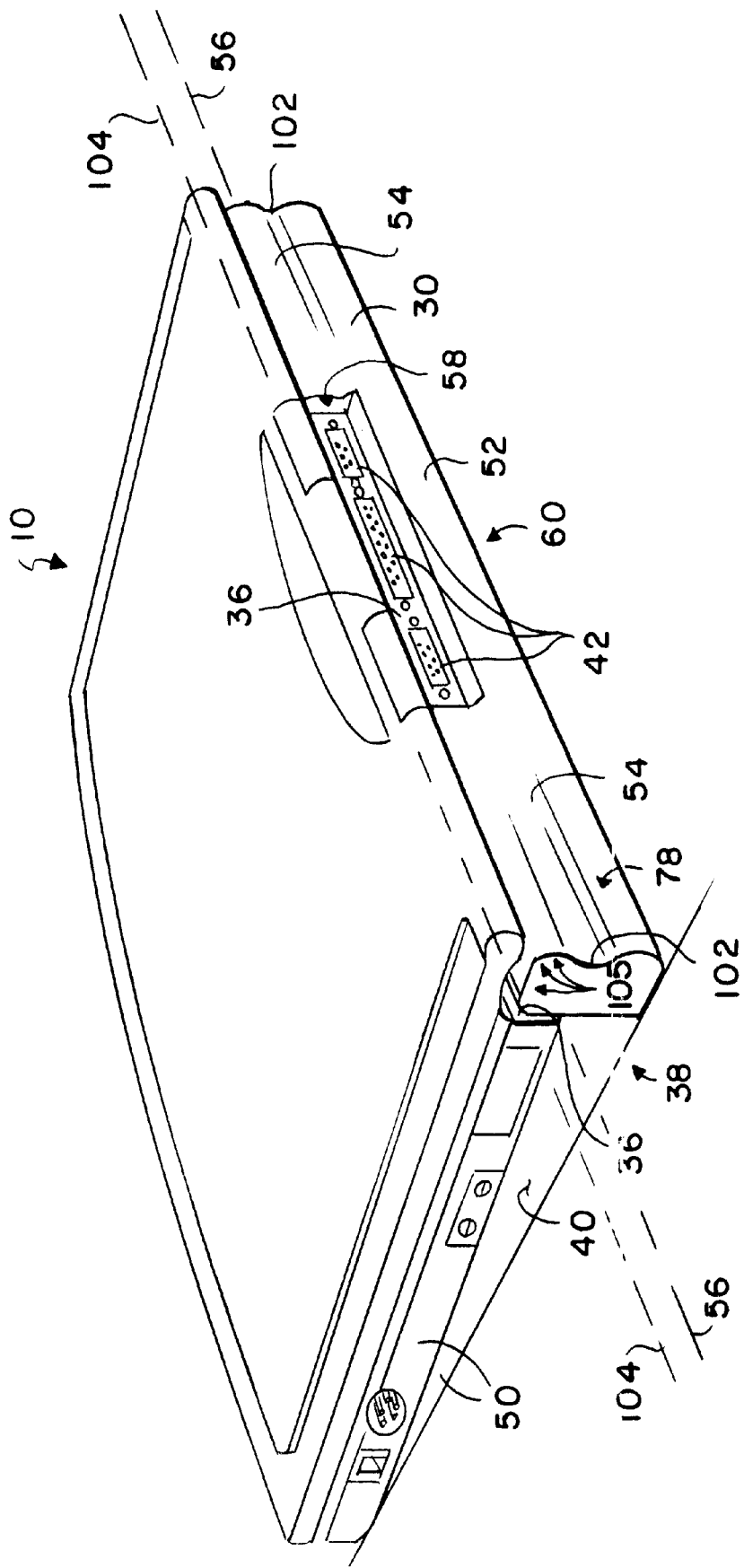
FIG. 3 is a top perspective view from the rear of the notebook computer of FIGS. 1–2 with its top closed. the battery pack is illustrated in the open position.

According to the principles of the invention, the battery housing 30 is movably mounted on the computer housing 12 and dimensioned such that the battery housing 30 can move between a closed position 34 wherein the battery housing 30 covers the rear wall 36 at the rear side 28 of the computer housing 12 (FIG. 2) and an open position 38 wherein the battery housing 30 serves to elevate the rear wall 36 of the computer housing 12 to provide a convenient typing angle when the computer 10 is resting on a support surface 40 (FIG. 3). Referring now to FIGS. 2 and 3, the battery housing 30 is shown rotatably mounted on the computer housing 12 such that the battery housing 30 rotates between the closed position 34 and the open position 38.

In FIG. 3, it can be seen that on the rear wall 36 of the computer housing 12 are connectors 42 for electrically connecting the computer 10 to pheral devices: serial communications lines, parallel printers, and the like. In FIG. 2, when the battery housing 30 is rotated into the closed position 34, it covers the connectors 42, and the bottom sides 44 and 46 of the computer housing 12 and battery housing 30 respectively then provide a continuous flat surface 48. In FIG. 3, when the battery housing 30 is shown rotated into the open position 38, the connectors 42 are exposed for use. Moreover, when rotated into the open position 38, the battery housing 30 serves to elevate the rear side 28 of the computer housing 12 to an angle 50 comfortable for typing on the keyboard 16. A comfortable typing angle 50 is known to be generally between 5 and 10 degrees.

As shown in FIG. 3, the battery housing 30 is an elongated housing having a narrow portion 52 and a wide portion 54. The narrow portion 52 is placed such that it is generally coextensive with the connectors 42 on the rear wall 36 of the computer housing 12 when the battery housing 30 is mounted on the computer housing 12. The axis of rotation 56 of the battery housing (FIG. 2) is shown to extend through the wide portion 54 of the battery housing 30 so that when the battery housing 30 is rotated into the closed position 34 the narrow portion 52 covers the connectors 42, and when the battery housing 30 is rotated into the open position 38 there is provided above the narrow portion 52 a space 58 through which the connectors 42 are exposed. Preferably, the connectors 42 are positioned cenrally on the rear wall 36 of the computer housing 12, and the narrow portion 52 of the battery housing 30 is positioned in the center 60 of the battery housing 30 so that is is coextensive with the connectors 42 when the battery housing 30 is mounted on the computer housing 12.

In addition to being movable when mounted on the computer housing 12, it is convenient, as shown, to have the battery housing 30 removably mounted. Referring specifically to FIG. 5, the battery housing 30 is shown removed from the computer housing 12.

Referring now to FIGS. 4 and 5, the battery housing 30 of FIG. 5 has the narrow portion 52 and two wider end portions 62. In the embodiment shown, a total of six batteries 32 can be held within the battery housing 30. Two batteries 32 reside in adjacent relationship within each wider end portion 62, and two batteries 32 reside in lengthwise relationship within the narrow portion 52.

The wider end portions 62 of the battery housing 30 form opposing inwardly facing surfaces 64. An opening 66 is formed between the opposing inwardly facing surfaces 64, which forms the space 58 through which the connectors 42 are exposed when the battery housing 30 is mounted on the computer housing 12 and rotated into the open position 38 (FIG. 3).

Figure 6:
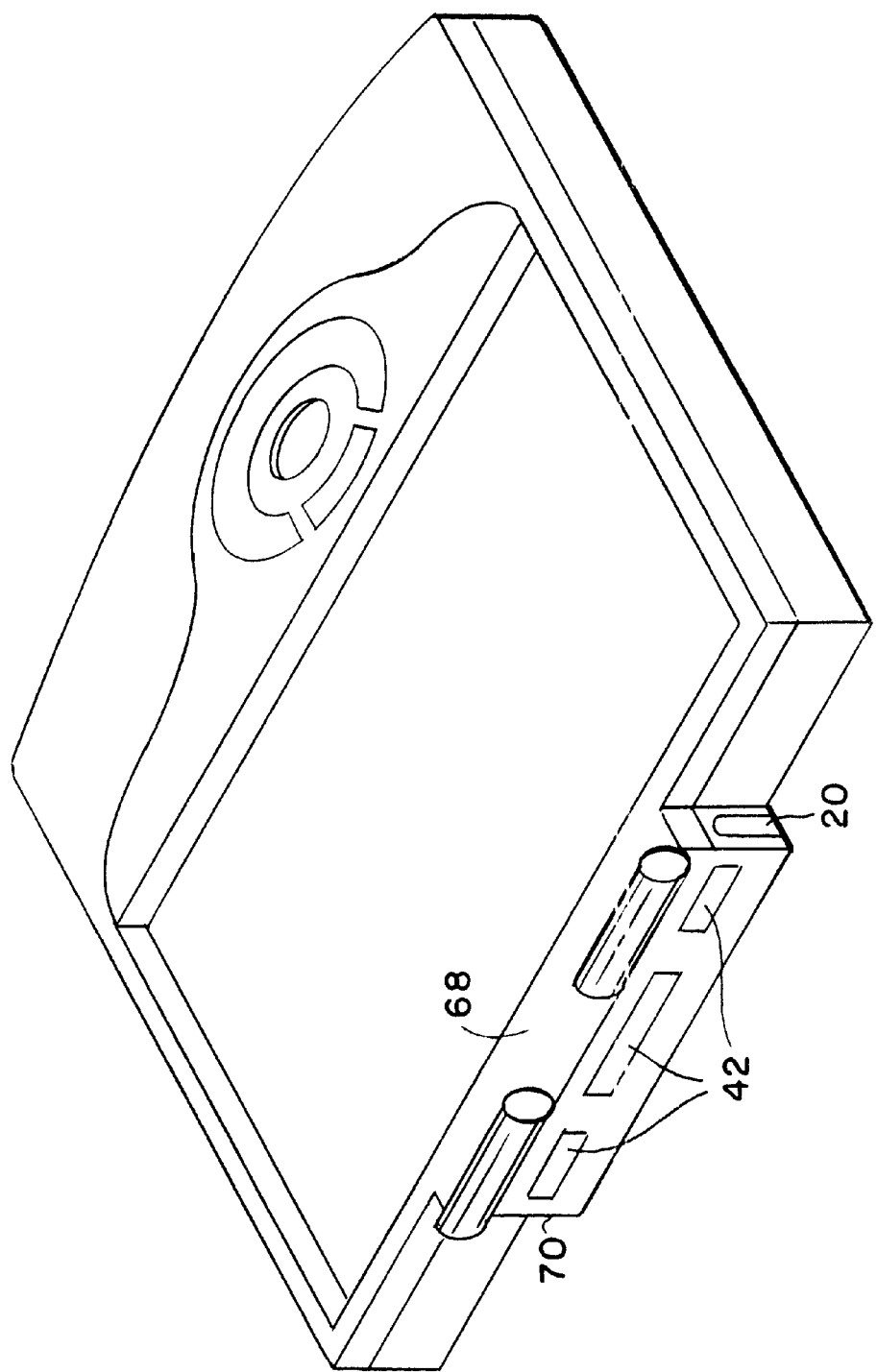
FIG. 6 is a perspective view of the computer of FIG. 1 with its screen top and battery pack removed.
Figure 10:
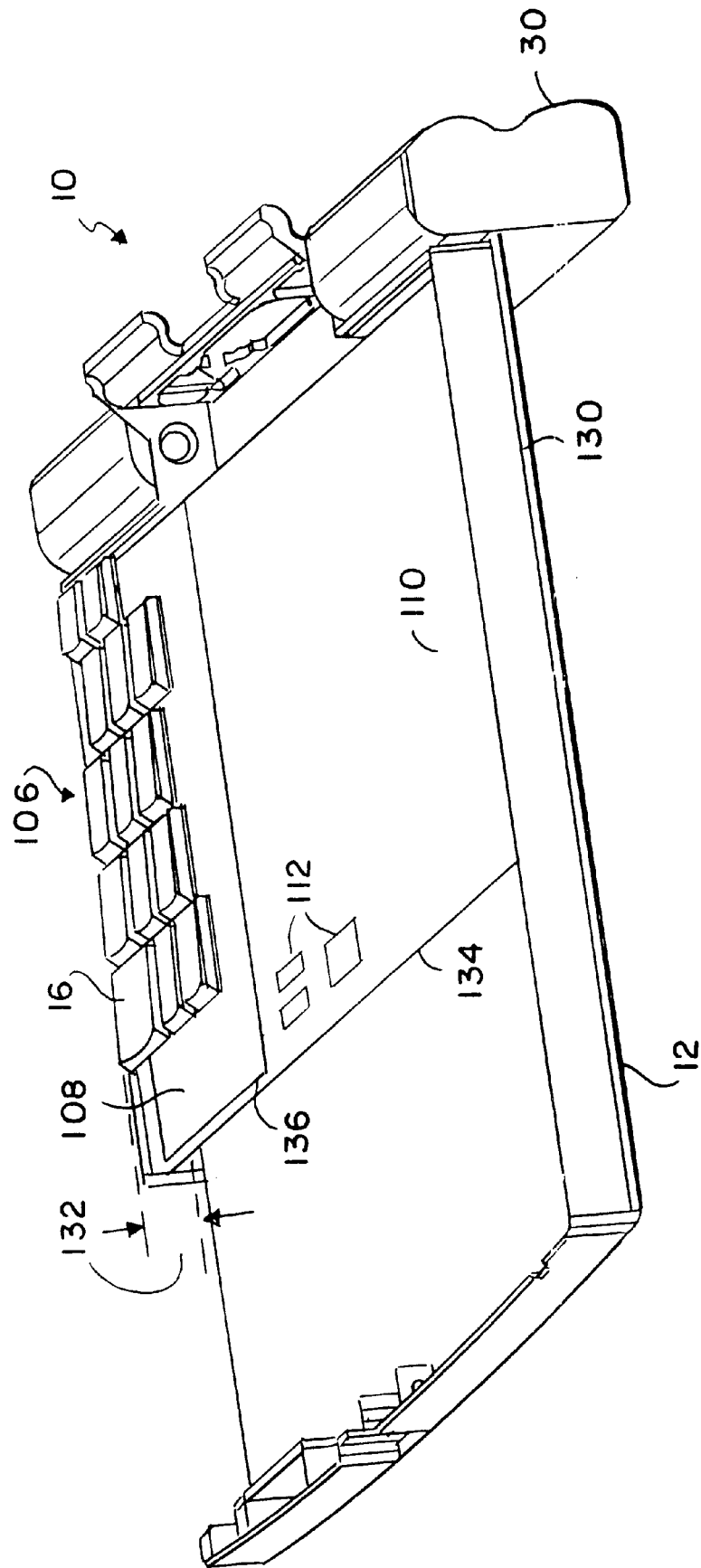
FIG. 10 is a perspective view of, partly in section, of the keyboard assembly and motherboard within the computer enclosure of FIG. 1 arranged according to the principles of the invention.
Figure 11:
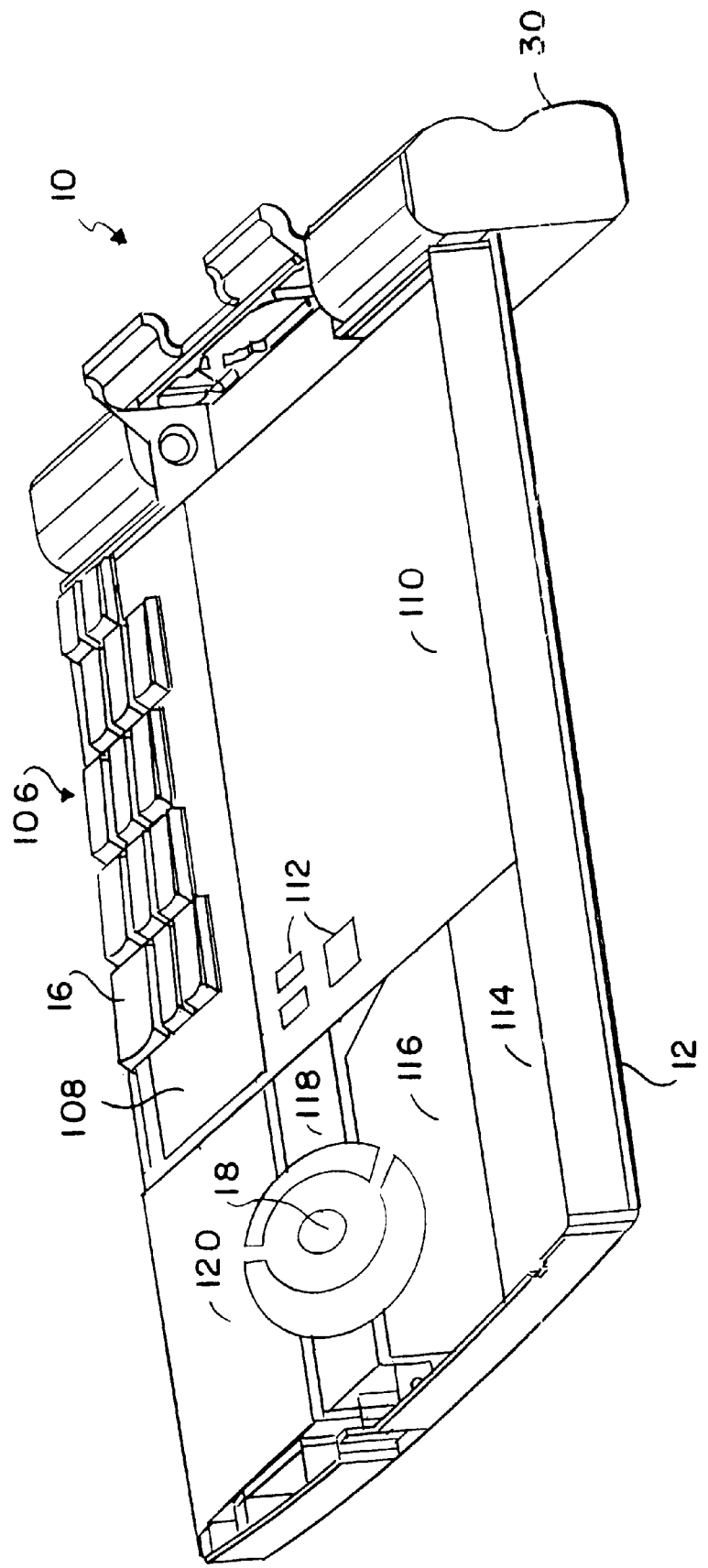
FIG. 11 is a perspective view of the layout of additional electrical components arranged within the computer enclosure of FIG. 1 in accordance with the principles of the invention.
Figure 12:
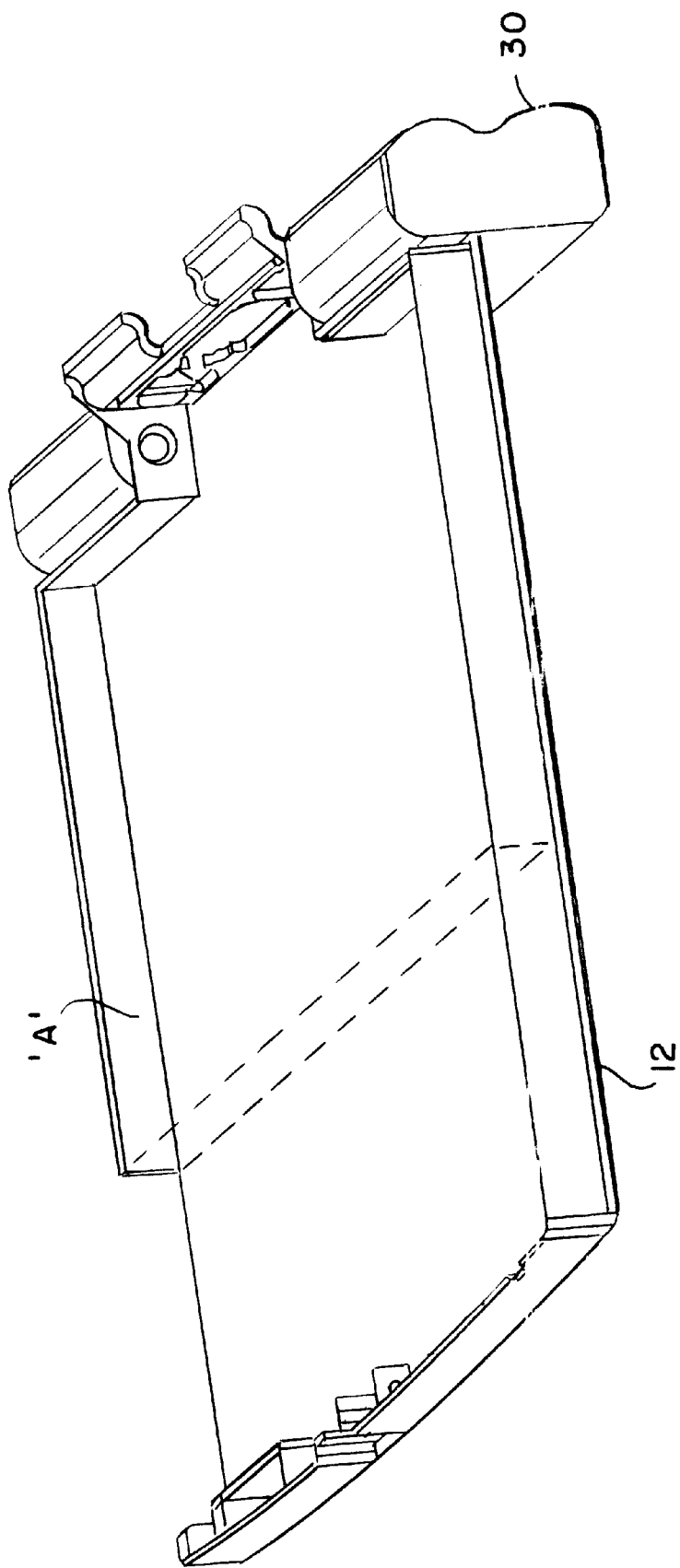
FIG. 12 is a perspective view of the region in the computer enclosure of FIG. 1 illustrating the region occupied by the keyboard assembly and motherboard when arranged as shown in FIGS. 10 and 11.
Figure 13:
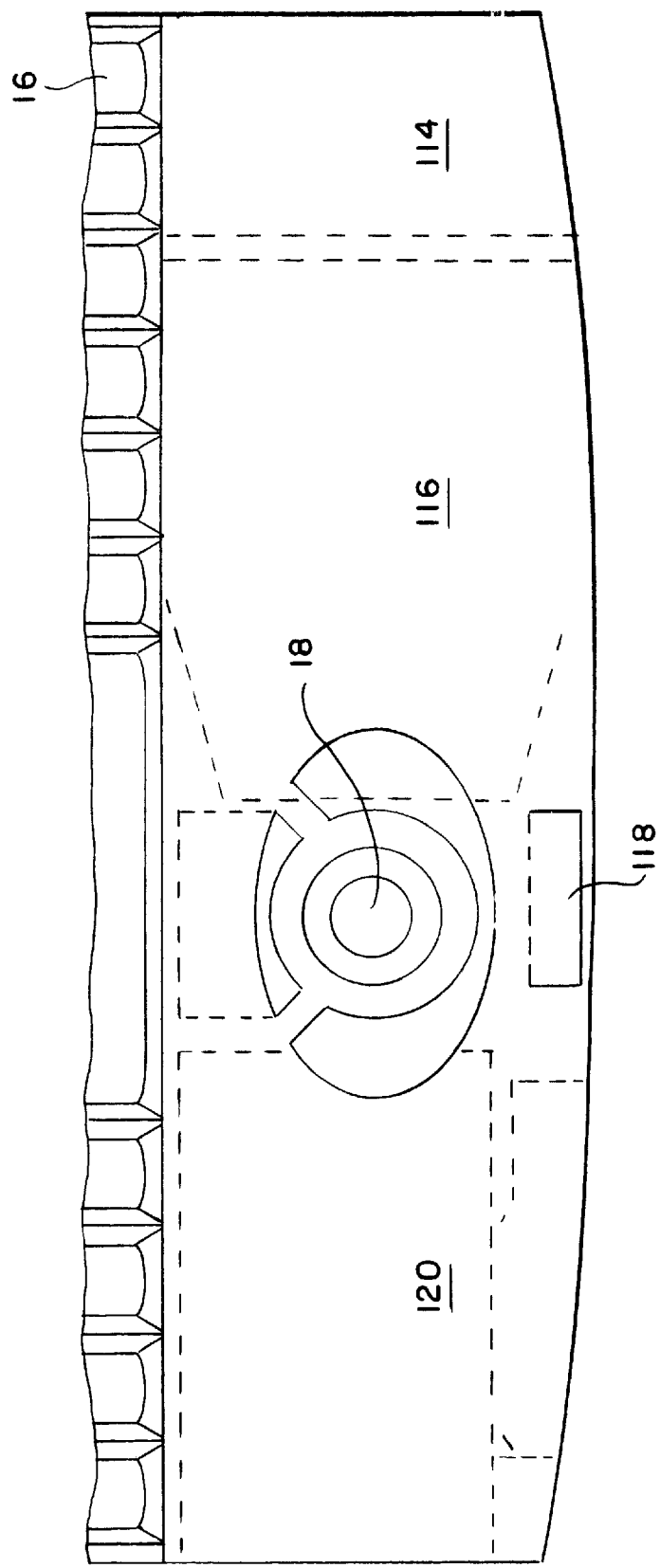
FIG. 13 is a top view of the forward portion of the computer of FIG. 1 with electrical components indicated by dotted lines.

Referring to FIGS. 4 and 6, the rear wall 36 of the computer housing 12 is shaped such that it has a central extended portion 68. The connectors 42 are located on this central extended portion 68. The central extended portion 68 has opposite outwardly facing sides 70. When the battery housing 30 is mounted on the computer housing 12, the central extended portion 68 of the computer housing 12 is located between the wider end portions 62 of the battery housing 30 such that the outwardly facing sides 70 of the central extended portion 68 oppose the respective inwardly facing surfaces 64 of the wider end portions 62 of the battery housing 30.

The battery housing 30 includes an electrical contact 72 located at one of the inwardly facing surfaces 64 effective to provide electrical power to the computer 10 during rotational movement of the battery housing 30. When the battery housing 30 is mounted on the computer housing 12, the electrical contact 72 mates with a mating electrical contact 76 located on the respective outwardly facing side 70 of the central extended portion 68 of the, computer housing 12. Electrical power is transferred between the batteries 32 and the components 14 within the computer housing 12 via the electrical contact 72 and mating electrical contact 76. Preferably, the electrical contact 72 is rotatable to provide rotatable mounting of the battery housing 30 to the computer housing 12 as well as the transfer of electrical power between the batteries 32 and the mating electrical contact 76.

Referring to FIGS. 7a, 7b, and 7c the electrical contact 72 and mating electrical contact 76 are shown in further detail. The electrical contact 72 is a cylindrically shaped member 80 on which several recessed copper contact strips 82 are circumferentially located. These contact strips 82 are electrically connected to the batteries 32 within the battery housing 30. The mating electrical contact 76 located on the computer housing 12 is a U-shaped contact including several copper sliders 84. When the battery housing 30 is mounted on the computer housing 12, the electrical contact 72 rests in the U-shaped contact such that the contact strips 82 electrically contact the sliders 84. Electrical power is then transferred from the batteries 32 through the contact strips 82 to the sliders 84 and on to power regulation and distribution circuitry located within the computer housing 12 which supplies the required voltages to the various components 14 within the, computer housing 12. According to the embodiment shown, the batteries 32 are arranged two in series, three in parallel to provide 7.2 Volts at up to 4 Amps.

Referring now to FIGS. 4, 6, 8a, 8b, 9a, and 9b on the opposite inwardly facing surface 64 of the battery housing 30 is shown a joint 88 which mates with a rotatable socket 90 located on the respective outwardly facing side 70 of the central extended portion 68 of the computer housing 12. The socket 90 includes a key or tab 92 which fits into a slot 94 centrally located through the joint 88. Rotation of the battery housing 30 is thus provided via the respective interactions between the rotatable electrical contact 72 and mating electrical contact 76, and between the joint 88 and the rotatable socket 90.

As shown in FIG. 4, on the bottom side 96 of the computer housing 12 two slidably mounted tab covers 98 slide to cover and uncover the mating electrical contact and the rotatable socket 90. In order to remove the battery housing 30 from the computer housing 12, the battery housing 30 is rotated into the open position 38 and the slidable tab covers 98 are slid toward each other to expose the rotatable connections. The open side of the U-shaped contact 100 is exposed, as is an open end of the slot 94. The battery housing 30 can then be lifted from the computer housing 12 so that the cylindrical electrical contact 72 is lifted through the open end of the U-shaped mating electrical contact 76, and the tab 92 of the joint 88 is lifted out of the slot 94. The battery housing 30 can be re-installed via the opposite motion wherein the cylindrical electrical contact 72 is dropped into the U-shaped mating electrical contact 76 and the tab 92 is placed into the slot 94. Sliding the tab covers 98 away from each other then locks the battery housing 30 to the computer housing 12 and allows rotatable motion of the battery housing 30 relative to the computer housing 12.

Other rotatable electrical contacts can be employed in place of the rotatable electrical contact 72 and mating electrical contact 76 herein shown while still maintaining rotatable electrical contact according to the principles of the invention. For example, a standard rotatable jack such as a headphone jack could be employed. Or, circular metallic contacts such as circular strips of copper could be located on the face of the cylindrical contact shown rather than circumferentially around it. The mating electrical contact 76 could then be a channel into which the cylindrical electrical contact 72 drops. The circular strips of copper would then mate with an opposing electrical contact on an inner face of the channel. Alternatively, the narrow portion 52 of the battery housing 30 could include straight metal pins extending lateral to, its lengthwise direction which mate with cooperating sockets on the computer housing. The sockets would be shaped such that electrical contact is maintained throughout the range of motion of the pins as the battery housing 30 is rotated.

Referring back to FIGS. 2 and 3, on the outwardly facing surface 78 of each of the wider end portions 62 of the battery housing 30 is formed a channel 102 extending in a direction along the axis of rotation 104 of the display screen 20. The shape of the channel 102 complements the shape of the rear edge 24 of the display screen 20 so that the display screen 20 can rotate without interference between the rear edge 24 and the outwardly facing surface 78 of the battery housing 30 when the battery housing 30 is rotated into the closed position 34. As shown in FIG. 2 the rounded rear edge 24 of the display screen 20 rests in the U-shaped channel 102.

Furthermore, the portion 105 of the outwardly facing surface 78 of each wider end portion 62 which is located between the channel 102 and the computer housing 12 when the battery housing 30 is rotated into the closed position 34 is radiused so that the battery housing 30 can rotate between the closed position 34 and the open position 38 without interference with the rear edge 24 of the display screen 20.

The very thin notebook computer herein described is but one of the many possible advantageous electronic device arrangements which can conceivably be obtained through application of the broad principle of the present invention which provides for the movable attachment of a battery housing to an electronic apparatus.

Furthermore, the very thin notebook computer 10 having a movable battery housing 30 mounted external to the computer housing 12 as presented herein is intended as only one example of this application of the present invention. Many arrangements falling within this computer application of the broad principle are conceivable. For instance, though the battery housing 30 is shown as rotatably mounted on the computer housing 12, the battery housing 30 could be movably mounted on the computer housing 12 by other means; for instance, by a sliding mechanism which would cause the battery housing 30 to slide in a closed position downwards relative to the computer housing 12, to an open position when the computer 10 is in use.

Moreover, though a computer housing 12 with a single central extended portion 68 for mating with a battery housing 30 having a central narrow portion 52 and two wider end portions 62 has been described, the narrow portion 52 could be located at an end of the battery housing 30, or a computer housing 12 with multiple extensions could conceivably mate with a battery housing 30 having multiple wider sections between which the multiple extensions of the computer housing 12 can mate.

Then, too, non-rotatable electrical contacts might be used, the battery housing being rendered movable by means other than rotatable electrical contacts. For example, standard mechanical hinges could be employed for rotation, while electrical contact is maintained via flexible wiring.

According to a further aspect of the invention, the placement of the battery housing 30 external to the computer housing 12 is combined with a particular layout of the electronic components 14 within the computer housing 12 to provide the very thin notebook computer 10. Referring now to the assembly views of FIGS. 10–13, located in the computer housing 12 is a generally rectangular keyboard assembly 106, which includes the keyboard 16 and a keyboard baseplate 108. A generally rectangular CPU motherboard 110 having component chips 112 mounted thereon is positioned directly below the keyboard assembly 106. As shown, the CPU motherboard 110 is of generally the same major dimensions as the keyboard assembly 106, the keyboard assembly 106 and motherboard 110 thereby defining a region 'A' within the enclosure. The remaining components 14 within the computer housing 12 reside in adjacent and generally co-planar relationship with this region.

In particular, adjacent to and generally coplanar with the region 'A' are placed a DC to DC converter 114, a hard disk drive 116, a trackball assembly 118 including the trackball 18, and a PCMCIA option slot 120. According to this arrangement, the DC to DC converter 114, the hard disk drive 116, the trackball assembly 118, the PCMCIA option slot 120, and the battery housing 30 all reside adjacent to and generally co-planar with each other and with the region 'A' and in which the keyboard assembly 106 and the motherboard 110 reside, resulting in a substantially thinner computer 10 than that provided by the prior art arrangement, wherein at least one of the hard disk drive 102, PCMCIA 108, or batteries 54 resides below the keyboard.

Referring in addition to FIG. 2, as shown, the height 122 of the computer 10 when the display screen 20 is folded down onto the computer housing 12 is approximately 1.0 inches (FIG. 2). The display screen 20 is shown to be approximately 7.5 mm thick. The computer housing 12 is approximately 18 mm high, with the top wall 128 and bottom wall 130 being approximately 1.2 mm thick. The keyboard assembly 106 has a height 132 of approximately 8.6 mm, and is placed towards the rear side 28 of the computer housing 12, directly above the motherboard 110, which has a width 134 of approximately 1 mm and is placed approximately 2 mm below the keyboard baseplate 108 (136). A 12.5 mm hard disk drive 116, a Dual Type II/Single Type III PCMCIA option slot 120 of less than 13 mm in height, and a trackball assembly 118 of less than 13 mm in height reside forward of, adjacent to, and coplanar with the region 'A'. A computer 10 having a total thickness of one inch results—thereby providing a 33%-70% thinness advantage over prior art notebook computers.

Also, though the embodiment shown presents a layout wherein the hard disk drive 116, trackball assembly 118, and PCMCIA option slot 120 are located in front of the keyboard assembly 106, the respective positions of these components can conceivably be reversed to obtain the same thinness advantage.

It is apparent that, within the scope of the invention, modifications and different arrangements may be made other than as herein disclosed. The present disclosure is merely illustrative, the invention comprehending all variations thereof.

What is claimed is:

1. A portable computer comprising:
    a computer housing for holding electronic components;
    an elongated battery housing for holding batteries for supplying power to said electronic components, the battery housing having a wide portion at each end and a narrow portion between the wide portions, a projection extending from each of the wide portions toward each other along the axis of rotation of the battery housing terminating in spaced apart relationship;
    spaced apart electrical contacts carried on each of the projections;
    mounting members spaced apart on the computer housing, each of the mounting members having a recess; and
    spaced apart electrical contacts mounted in the recess of each of the mounting members, the mounting members being positioned so that the projections are received in the recesses with the electrical contacts on the projections and the electrical contacts in the recesses in electrical contact with each other and with the battery housing mounted for rotational movement on the computer housing.

2. Apparatus comprising:
    an enclosure for holding electronic components, the enclosure having a first electrical contact; and
    a battery housing for holding batteries that supply electrical power to the electronic components, the battery housing having a second electrical contact and being rotatably mounted externally on the enclosure,
    the first electrical contact on the enclosure and the second electrical contact on the battery housing providing the rotatable mounting.

3. The apparatus of claim 1 wherein the housing for holding batteries is removably mounted on the enclosure.

4. The apparatus of claim 1 wherein the housing is mounted at one side of the enclosure.

5. The apparatus of claim 4 wherein the enclosure includes a front side and a rear side and the housing is mounted for rotational movement at the rear side.

6. The apparatus according to claim 1 wherein the first electrical contact on the enclosure and the second electrical contact on the battery housing are in electrical contact with each other for supplying power to the electronic components throughout any and all rotational movement of the battery housing.

7. A portable computer comprising:
    a computer housing for holding electronic components, the computer housing having a first electrical contact; and
    a battery housing for holding batteries that supply power to said electronic components, the battery housing having a second electrical contact and being rotatably mounted externally on the computer housing,
    the first electrical contact on the computer housing and the second electrical contact on the battery housing providing the rotatable mounting, the electrical contacts being in electrical contact with each other for supplying power to the electronic components throughout any and all rotational movement of the battery housing.

8. The computer of claim 7 wherein the battery housing is removably mounted on the computer housing.

9. The computer of claim 8 wherein the computer housing has a rear wall, and wherein the battery housing is dimensioned such that the battery housing can move between a closed position wherein the battery housing covers the rear wall and an open position wherein the battery housing is effective to elevate the rear wall of the computer housing to provide a convenient typing angle when the computer is resting on a support surface.

10. The computer of claim 8 wherein the computer housing has a rear wall, and wherein the battery housing is dimensioned such that the battery housing can rotate between a closed position wherein the battery housing covers the rear wall and an open position wherein the battery is effective to elevate the rear wall of the computer housing to provide a convenient typing angle when the computer housing is resting upon a support surface.

11. The computer of claim 8 wherein the computer housing has a rear wall, electrical connectors being mounted on the rear wall, and wherein the battery housing is dimensioned such that the battery housing can rotate between a closed position wherein the battery housing covers the electrical connectors and an open position wherein the battery housing exposes said electrical connectors, the battery housing when located in the open position being effective to elevate the rear wall of the computer housing to provide a convenient typing angle when the computer housing is resting on a support surface.

12. The computer of claim 11 wherein the battery housing is an elongated housing dimensioned to have a wide portion and a narrow portion, the narrow portion being generally coextensive with the connectors on the rear wall of the computer housing, the axis of rotation of the battery housing extending through the wide portion and generally parallel to the longitudinal axis of the battery housing so that when the battery housing is rotated into the closed position the narrow portion covers the connectors and when the battery housing is rotated into the open position the narrow portion provides a space for exposing the connectors.

13. The computer of claim 12 wherein the connectors are positioned centrally on the rear wall of the computer housing and wherein the narrow portion of the battery housing is positioned in the center of the battery housing.

14. The computer of claim 7 wherein the battery housing has an elongated shape with a wide portion and an immediately adjacent narrow portion, the wide portion having a surface facing generally in the direction of the narrow portion, a projection extending from the surface along the axis of rotation of the battery housing, the electrical contact on the battery housing being carried on the projection, and wherein the computer further comprises:

a mounting member on the computer housing, the mounting member having a recess, the electrical contact on the computer being mounted in the recess, the recess having a shape and dimension to receive the projection so that the electrical contact on the projection and the electrical contact in the recess are in electrical contact with each other and so that the battery housing is mounted for rotational movement on the computer housing.

15. A computer comprising:

a computer housing for holding electronic components, the computer housing having a first electrical contact; and a battery housing, for holding batteries that supply power to the electronic components, having a second electrical contact, the battery housing being rotatably and externally mounted on the computer housing with the first and second electrical contacts being in electrical contact with each other for supplying electrical power to the electronic components throughout any and all rotational movement of the battery housing, the rotational movement having an axis of rotation that extends through the electrical contacts of the battery housing and the computer housing.

\* \* \* \* \*